(12) United States Patent
Kato

(10) Patent No.: US 6,834,422 B2
(45) Date of Patent: Dec. 28, 2004

(54) METHOD OF FORMING STATOR WINDING OF ROTARY ELECTRIC MACHINE

(75) Inventor: Mitsuru Kato, Anjo (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/359,728

(22) Filed: Feb. 7, 2003

(65) Prior Publication Data

US 2003/0159270 A1 Aug. 28, 2003

(30) Foreign Application Priority Data

Feb. 27, 2002 (JP) ........................................ 2002-051545

(51) Int. Cl.⁷ .............................................. H02K 15/00
(52) U.S. Cl. ............................ 29/596; 29/598; 29/732; 29/605; 219/125.11; 310/179
(58) Field of Search ................. 219/75, 137 R, 219/125.11; 29/596, 598, 732, 735, 605; 310/207, 184, 179, 215, 201, 180

(56) References Cited

U.S. PATENT DOCUMENTS

| | | | | |
|---|---|---|---|---|
| 6,140,735 A | * | 10/2000 | Kato et al. .................. | 310/201 |
| 6,181,043 B1 | | 1/2001 | Kusase et al. | |
| 6,181,044 B1 | * | 1/2001 | Umeda et al. ............... | 310/201 |
| 6,403,921 B1 | | 6/2002 | Maeda et al. | |
| 6,414,410 B1 | * | 7/2002 | Nakamura et al. .......... | 310/179 |
| 6,459,177 B1 | * | 10/2002 | Nakamura et al. ............ | 310/42 |
| 6,490,779 B1 | | 12/2002 | Tokizawa et al. | |
| 6,530,140 B2 | * | 3/2003 | Maeda et al. ................. | 29/596 |
| 6,604,272 B1 | * | 8/2003 | Maeda et al. ................. | 29/596 |
| 2002/0053126 A1 | | 5/2002 | Maeda et al. | |
| 2003/0159270 A1 | * | 8/2003 | Kato ........................... | 29/596 |

FOREIGN PATENT DOCUMENTS

| EP | 1 041 696 A1 | 10/2000 |
|---|---|---|
| EP | 1 128 530 A2 | 8/2001 |

* cited by examiner

Primary Examiner—Minh Trinh
(74) Attorney, Agent, or Firm—Oliff & Berridge, PLC

(57) ABSTRACT

A stator winding wound on a cylindrical stator core of a rotary electric machine such as an alternator for use in an automobile vehicle is formed in the following manner. Plural U-shaped conductor segments are inserted into slots formed in the stator core. Pairs segment ends to be electrically connected are aligned along two or more coaxial circumferences and correctly positioned by individually restricting each pair of segment ends. Correctly positioned plural pairs are continuously welded one by one by rotating the stator core.

4 Claims, 8 Drawing Sheets

FRONT SIDE ←→ REAR SIDE

US 6,834,422 B2

METHOD OF FORMING STATOR WINDING OF ROTARY ELECTRIC MACHINE

CROSS-REFERENCE TO RELATED APPLICATION

This application is based upon and claims benefit of priority of Japanese Patent Application No. 2002-51545 filed on Feb. 27, 2002, the content of which is incorporated by reference.

BACKGROUND OF THE INVENTION

1. Field of the Invention

The present invention relates to a method of forming a stator winding of a rotary electric machine.

2. Description of Related Art

A method of electrically connecting ends of plural U-shaped conductor segments by arc-welding has been utilized thitherto. For example, JP-B1-3104700 discloses this kind of method, and a similar method is disclosed also in JP-B2-3196738. Essence of the method disclosed in JP-B1-3104700 is shown in FIGS. 10-13 attached to the present specification.

As shown in FIG. 10, a stator winding is formed by plural U-shaped conductor segments. Four conductors 404 are inserted into a slot formed in a stator core 400, and ends 406 of the conductors 404 extend form one axial end of the stator core 400. The conductor ends 406 make plural pairs of conductor ends as shown in FIG. 11, and each pair of the conductor ends is electrically connected by welding. As shown in FIG. 12, in a welding process, an outside of the pair of conductor ends 406 is restricted by an outside electrode 412, and an inside of the pair of conductor ends 406 is restricted by an inside electrode 410. The outside electrode 412 is formed in a shape shown in FIG. 13. A rod-shaped electrode 414 is placed between the pairs of conductor ends neighboring each other in the circumferential direction.

A torch 420 is brought to a vicinity of the conductor ends 406 which contact the outside and inside electrodes 412, 410 and the rod-shaped electrode 414. A minus voltage is applied to the torch 420 and a plus voltage is applied to the outside and inside electrodes 412, 410. Each pair of conductor ends is welded by heat generated by arc discharge between the torch 420 and the conductor ends 406. All the pairs of conductor ends are welded in this manner one by one by moving the torch 420.

In the conventional welding process described above, however, it has been difficult to establish a close contact between the conductor ends to be welded by restricting them with the outside and inside electrodes 412, 410, because there is a space between two pairs of conductor ends aligned in the radial direction. If the conductor ends 406 to be electrically connected to each other by welding do not closely contact each other, they may not be sufficiently welded.

SUMMARY OF THE INVENTION

The present invention has been made in view of the above-mentioned problem, and an object of the present invention is to provide an improved method of forming a stator winding, and more particularly to provide a method of forming a good electrical connection between ends of U-shaped conductor segments.

A stator of a rotary electric machine such as an alternator for use in an automotive vehicle is composed of a cylindrical stator core and a stator winding formed in the stator core. The cylindrical stator core has plural slots into which U-shaped conductor segments forming the stator winding are inserted.

In a process of forming the stator winding, the plural U-shaped conductor segments, each having a turning portion and straight portions, are inserted in the slot from one axial end of the stator core. Plural straight portions, e.g., four straight portions, are inserted into one slot, so that ends of conductor segments extend from the other axial end of the stator core. The segment ends extending from the stator core are bent to make plural pairs of segment ends to form the stator winding by electrically connecting the segment ends belonging to each pair.

The plural pairs of the segment ends are positioned along two or more coaxial circumferences. Each pair on one circumference is aligned in a zigzag manner in the radial direction with respect to each pair on the other circumference. In order to correctly position the pairs of segment ends and to establish a close contact between segment ends belonging to each pair, the pairs of segment ends are restricted by a restricting device composed of an inside restricting member and an outside restricting member. Each pair of segment ends is individually interposed between both restricting members and pressed by them.

Then, a welding electrode of a welding apparatus is brought to a vicinity of each pair of segment ends so that the segment ends belonging to each pair are welded by heat generated by an arc-discharge between the welding electrode and the segment ends. In this welding process, the stator is rotated relative to the welding electrode, while maintaining the welding apparatus activated and keeping a predetermined distance between the welding electrode and each pair of segment ends. Thus, all pairs of segment ends are continuously welded one by one, establishing electrical connection between segment ends belonging to each pair. Since the welding apparatus is kept activated during the welding process, the arc-discharge is kept stable, and a time required for the welding process is shortened. In the welding process, the arc-welding may be replaced with other methods such as soldering or ultrasonic welding.

In the process of restricting the pairs of segment ends, it is preferable to use a space-keeping member in addition to the inside and outside restricting members. The space-keeping member is inserted between neighboring pairs of segment ends that are aligned along the circumference to correctly keep a predetermined space between the neighboring pairs. The space-keeping member may be formed integrally with the inside and outside restricting members, or it may be formed separately therefrom.

According to the present invention, pairs of the segment ends are correctly positioned, and segment ends belonging to each pair closely contact each other. Therefore, electrically connection in each pair of segment ends is attained by welding without fail.

Other objects and features of the present invention will become more readily apparent from a better understanding of the preferred embodiment described below with reference to the following drawings.

DETAILED DESCRIPTION OF THE PREFERRED EMBODIMENT

Figure 1:
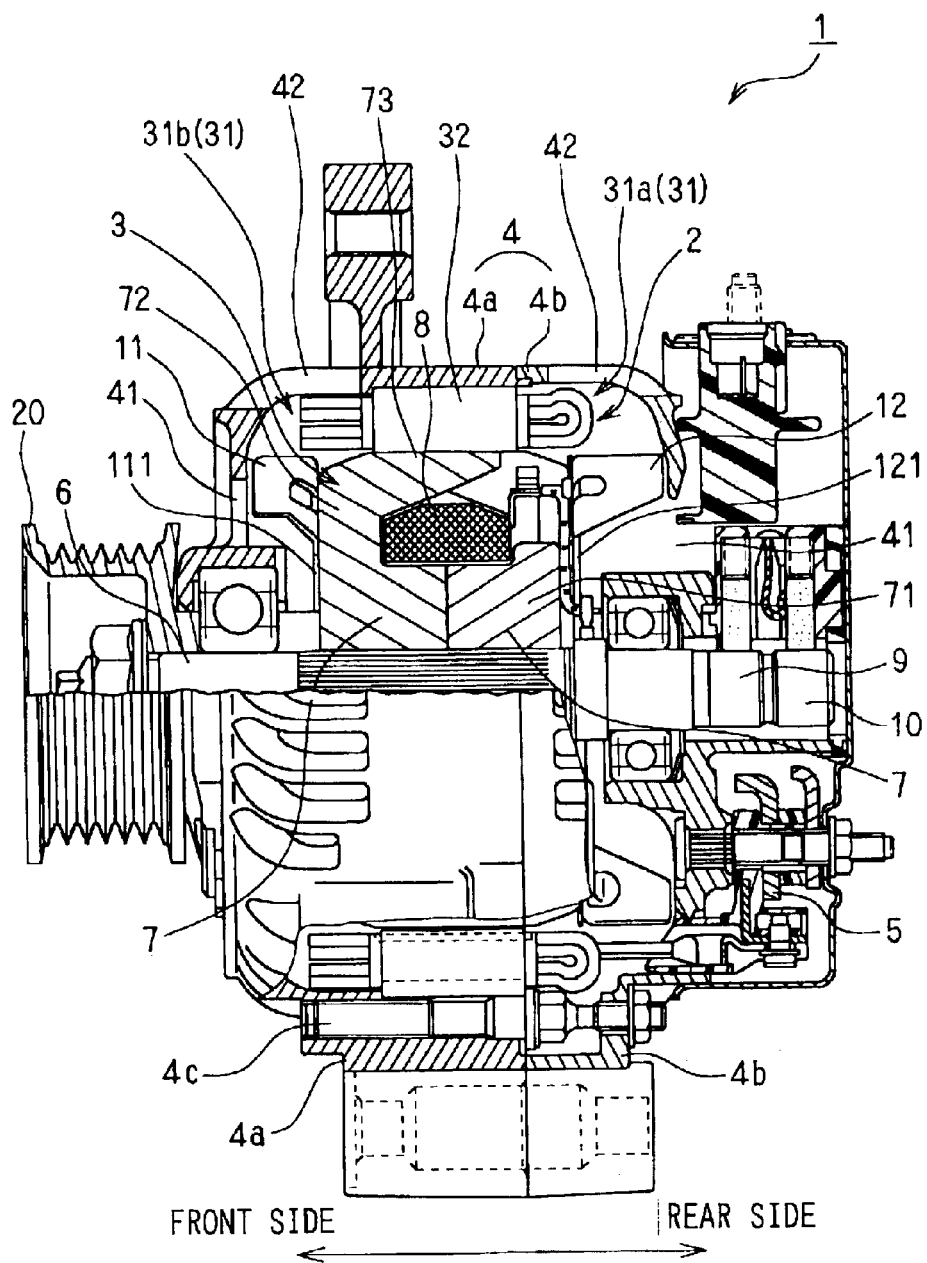
FIG. 1 is a cross-sectional view showing an entire structure of an alternator.

A preferred embodiment of the present invention will be described with reference to FIGS. 1–6. First, referring to FIG. 1, a structure of an alternator 1 for use in an automotive vehicle will be described. The alternator 1 includes a stator 2, a rotor 3, a housing 4, a rectifier 5 and other associated components. The rotor 3 is composed of a shaft 6, a Lundell-type pole core 7 fixed to the shaft 6, a field coil 8 wound on the pole core 7, and slip rings 9, 10 fixed to the shaft 6. A slant fan 11 is connected to a front side of the pole core 7, and a centrifugal fan 12 is connected to a rear side of the pole core 7. A pulley 20 is fixed to a the shaft 6, and the rotor 3 is rotated by an engine mounted on an automobile.

The Lundell-type pole core 7 is a known type and composed of a pair of cores, each having a boss 71 fixed to the shaft 6, a disc portion 72 and six claw poles 73. By coupling the pair of cores to face each other, a pole core 7 having twelve claw poles is formed. The slant fan 11 is composed of a base plate 111 connected to a front surface of the pole core 7 by welding or the like and blades each having a portion slanted relative to the base plate 111 and an upright portion. The centrifugal fan 12 is composed of a base plate 121 connected to a rear surface of the pole core 7 and blades standing from the base plate 121 with a right angle.

The housing 4 is composed of a front housing 4a and a rear housing 4b, both being connected by through-bolts 4c. Cooling air is introduced into the housing 4 through inlet windows 41 formed at both axial sides of the housing 4, and the cooling air is blown out through outlet windows 42 formed at shoulder portions of the housing 4. The rectifier 5 for rectifying alternating current into direct current is mounted on the rear side of the housing 4. The stator 2 functioning as an armature is composed of a cylindrical stator core 32 having plural slots 35 (shown in FIG. 2) and a stator winding 31 formed by plural U-shaped conductor segments 33 inserted into the slots 35.

Figure 2:
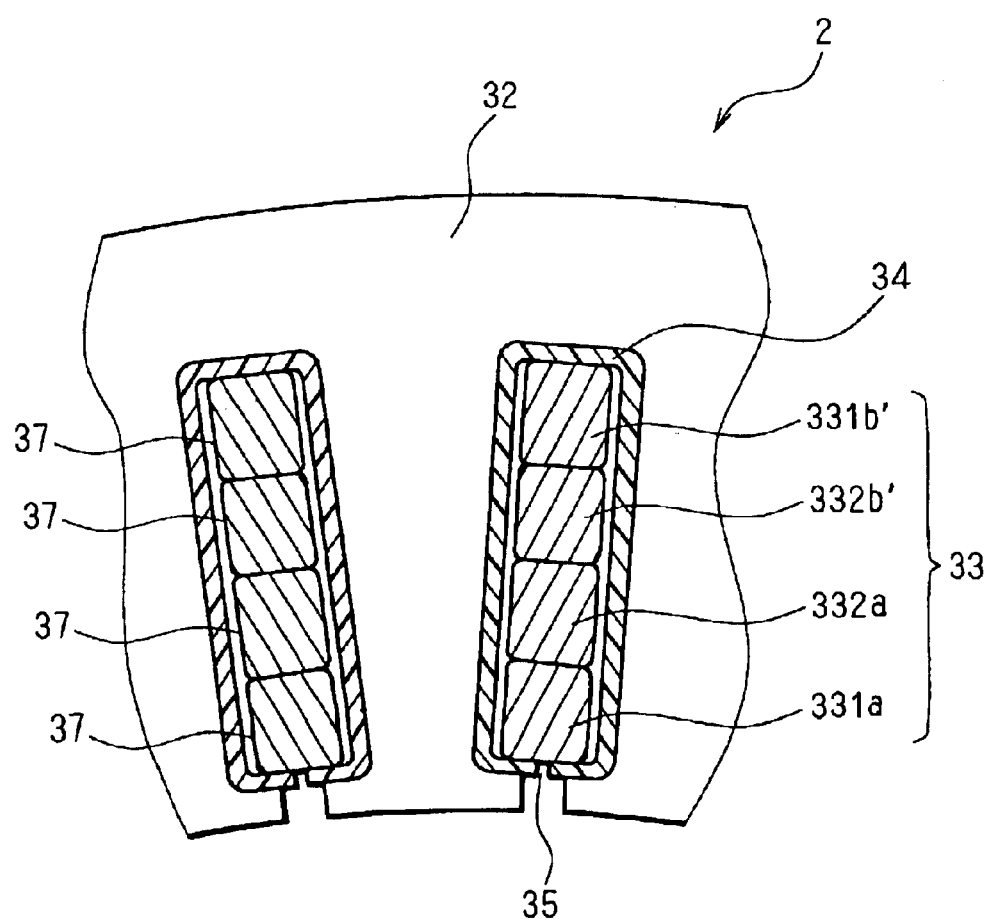
FIG. 2 is a cross-sectional view showing stator slots in which conductors of U-shaped conductor segments are inserted.

Now, referring to FIGS. 2 and 3, the stator winding 31 will be described in detail. As shown in FIG. 2, conductors of the U-shaped conductor segments 33 are inserted into the slots 35 of the stator core 32. The conductors inserted into the slots 35 are insulated from the stator core 32 by an insulator 34. Plural slots 35, each having an opening at an inner surface of the stator core 32, are formed in the stator core 32 so that a multi-phase stator winding is accommodated in the slots 35. In this particular embodiment, 36 slots for accommodating a three-phase stator winding are formed.

Figure 3:
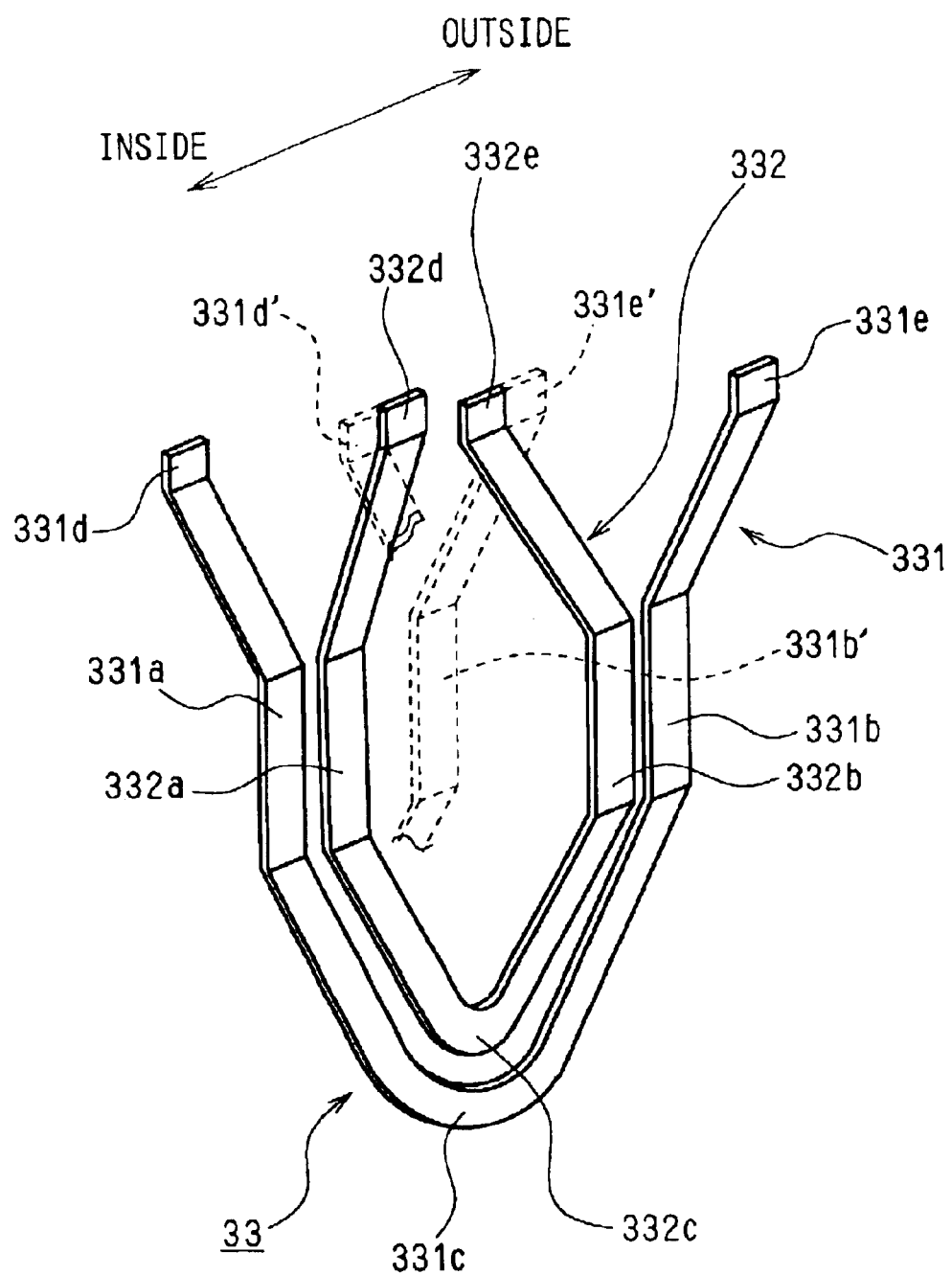
FIG. 3 is a perspective view showing a large conductor segment and a small conductor segment.

As shown in FIG. 3, the conductor segments 33 include a large conductor segment 331 and a small conductor segment 332. Both of the large and small conductor segments 331, 332 are made of a conductive wire such as a copper wire having a rectangular cross-section. The conductive wire covered with an insulation film 37 (shown in FIG. 2) is formed into U-shaped conductor segments. The large conductor segment 331 includes a pair of straight conductor portions 331a and 331b, a turning portion 331c connecting the pair of conductor portions, and a pair of segment ends 331d and 331e. Similarly, the small conductor segment 332 includes a pair of straight conductor portions 332a and 332b, a turning portion 332c connecting the conductor portions, and a pair of segment ends 332d and 332e.

As shown in FIG. 2, the conductor portion 331a is positioned at an inner most position in the slot 35, and therefore the conductor portion 331a is referred to as a first layer conductor. The conductor portion 332a is positioned next to the first layer conductor 331a and referred to as a second layer conductor. The conductor portion 332b that makes a pair with the conductor portion 332a is inserted into another slot 35 that is one-pole pitch apart from the slot in which the conductor portion 332a is inserted and is positioned at a third layer position in that slot. The conductor portion 332b is referred to as a third layer conductor. The conductor portion 331b that makes a pair with the conductor portion 331a is inserted into the same slot into which the conductor portion 332b is inserted and positioned at a fourth layer position (an outermost position) in that slot. FIG. 2 shows the one slot where the first layer conductor 331a, the second layer conductor 332a, a third layer conductor 332b' (a third layer conductor of another segment), and a fourth layer conductor 331b' (a fourth layer conductor of another segment) are inserted in this order.

A rear coil end 31a (shown in FIG. 1) is formed by turning portions 331c, 332c of plural conductor segments, and each turning portion 332c of the small segment 332 is positioned inside each turning portion 331c of the large segment 331. A front coil end 31b (shown in FIG. 1) is formed by segment ends and slanted portions connecting the segment ends and the conductor portions of plural conductor segments. The segment end 332d of the small conductor segment 332 and a segment end 331d' of a large conductor segment 331 are electrically connected by welding, as shown in FIG. 3. Similarly, the segment end 332e of the small conductor segment 332 and a segment end 331e' of another large conductor segment 331 are electrically connected by welding. The three-phase stator winding 31 is formed by electrically connecting the segment ends of the plural U-shaped conductor segments in this manner. Since the three-phase winding is electrically connected in a known manner, details of the connection will not be explained here.

Figure 4:
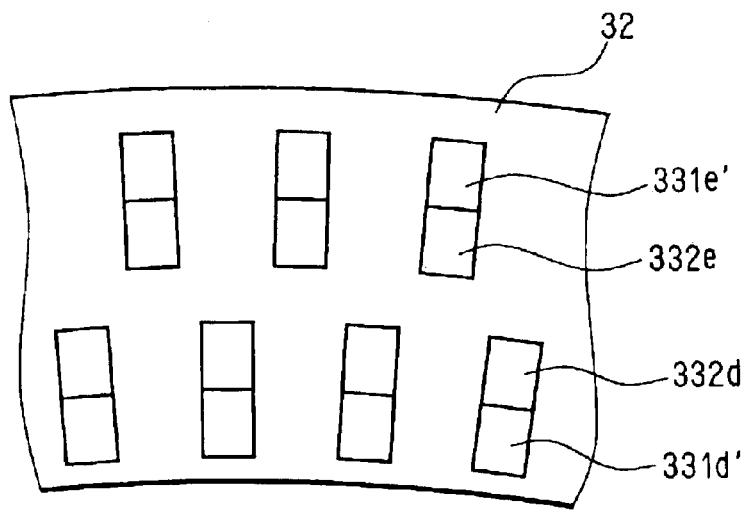
FIG. 4 is a plan view showing an arrangement of segment ends extending from one axial end of a stator core.

FIG. 4 shows an arrangement of the segment ends, viewed from the front side of the stator core 32. That is, plural pairs of segment ends, each pair consisting of the segment ends 331d' and 332d, are aligned along an inner circumference with equal intervals therebetween. Plural pairs of segment ends, each pair consisting of the segment ends 332e and 331e', are aligned along an outer circumference, which is coaxial with the inner circumference, with equal intervals therebetween. Further, the segment end pairs aligned along the inner circumference (referred to as inside pairs) are positioned not to be in line, in the radial direction, with the segment end pairs aligned along the outer circumference (referred to as outside pairs). In other words, the each of the outside pairs is positioned in a zigzag manner with respect to each of the inside pairs, as shown in FIG. 4.

Now, a manufacturing process of the stator winding 31 will be described. Plural U-shaped conductor segments including the large conductor segments 331 and the small conductor segments 332 are prepared. The U-shaped conductor segments are inserted into slots 35 from the rear side of the stator core 32, so that the conductor portions are positioned in each slot 35 as shown in FIG. 2. That is, the first layer conductor 331a, the second layer conductor 332a, the third layer conductor 332b' and the fourth layer conductor 331b' are positioned in this order from the inside of the stator 32. The turning portions 332c of the small conductor segments 332 are covered by the turning portions 331c of the large conductor segments 331, thereby forming the rear coil end 31a.

After the conductor segments are inserted into the slots 35, straight portions of the segments extending to the front side of the stator core 32 are bent, so that a distance between the segment ends 331d and 331e of the large conductor segment 331 is widened, and a distance between the segment ends 332d and 332e is narrowed. More particularly, each straight portion of the large conductor segment 331 is bent by 1.75 slot-pitches, and each straight portion of the small conductor segment 332 is bent by 1.25 slot-pitches, thereby positioning the segment ends 331d, 331e, 332d, 332e as shown in FIG. 3. All the conductor segments are bent in the same manner. Thus, the segment ends are arranged as shown in FIG. 4, aligning pairs of segment ends 331d', 332d along the inner circumference and aligning pairs of segment ends 332e, 331e' along the outer circumference. At the same time, the pairs of segment ends aligned along the inner circumference are positioned in a zigzag manner with respect to those aligned along the outer circumference. Then, each pair of the segment ends is electrically connected by welding.

Figure 5:
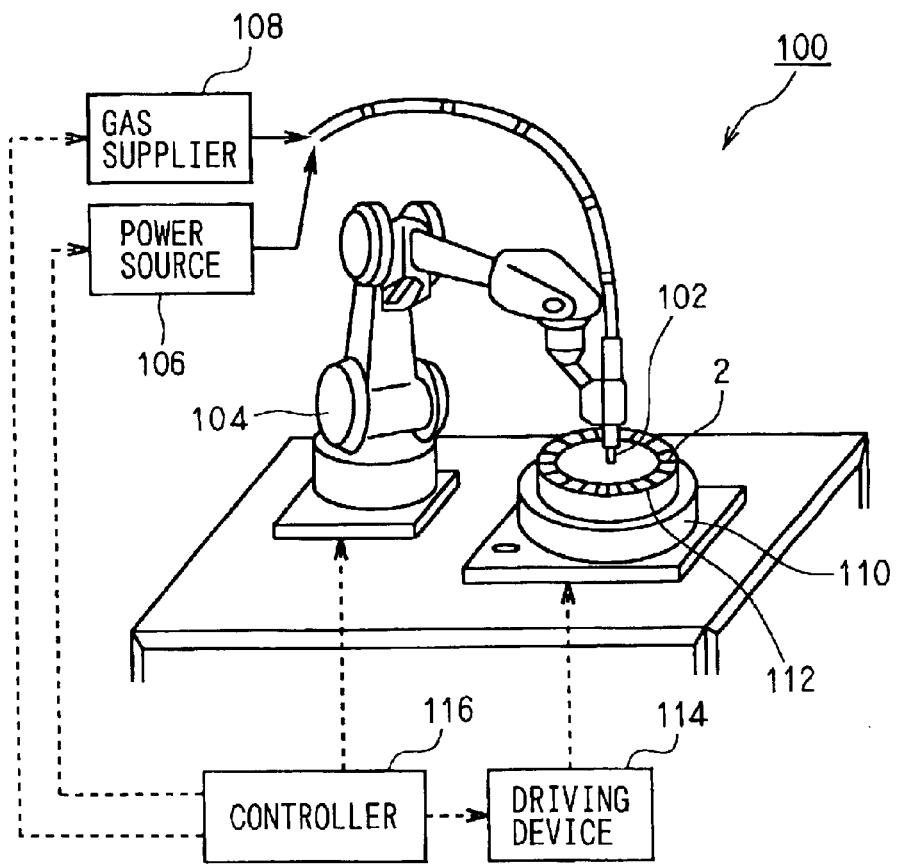
FIG. 5 is a perspective view briefly showing a welding apparatus for welding segment ends.
Figure 6:
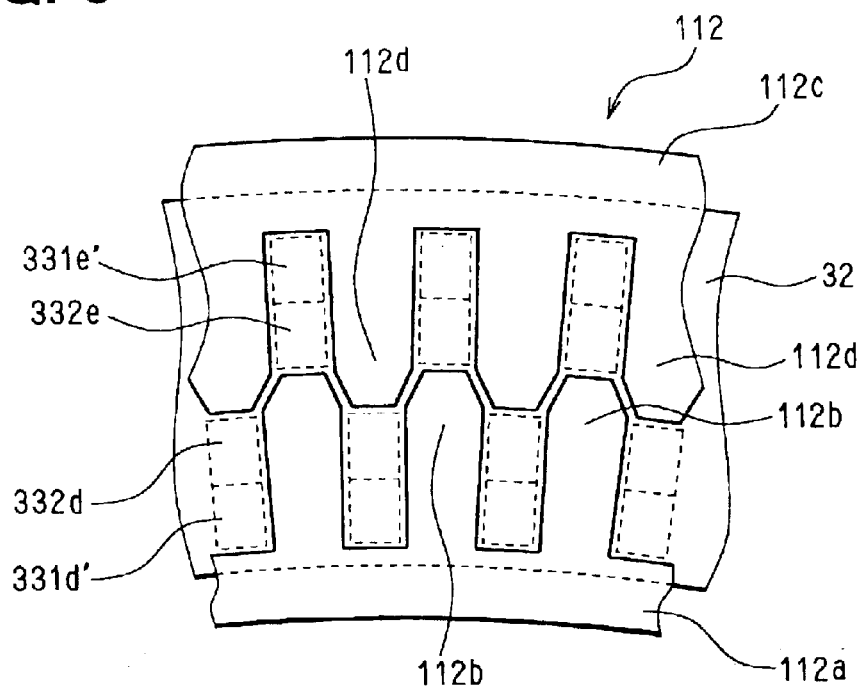
FIG. 6 is a plan view showing a device for restricting segment ends.

The process of electrically connecting the pairs of the segment ends will be described in detail with reference to FIGS. 5 and 6. FIG. 5 shows a welding apparatus 100, and FIG. 6 shows a restricting device 112 for restricting positions of the segment ends. The welding apparatus 100 includes: a torch 102 having a minus-electrode made of tungsten; an automatic arm 104 for moving the torch 102; a power source 106 for supplying welding power to the torch 102; a gas supplier 108 for supplying inert gas such as argon or helium to the torch 102; a base plate 110 for mounting the stator 2 thereon; a restricting device 112 for restricting positions of the pairs of segment ends; a driving device for rotating the base plate 110; and a controller 116 for controlling operation of the automatic arm 104, the driving device 114, the power source 106 and the gas supplier 108.

The restricting device 112 included in the welding apparatus 100 is shown in FIG. 6 in an enlarged scale. The restricting device 112 is composed of an inside restricting member 112a including space-keeping members 112b and an outside restricting member 112c including other space-keeping members 112d. The inside pairs of the segment ends and the outside pairs of the segment ends are placed between the inside restricting member 112a and the outside restricting member 112c, and are pressed by the inside restricting member 112a from their inside and by the outside restricting member 112c from their outside. Thus, positions of the pairs of segment ends are restricted and the segment ends belonging to each pair closely contact to each other.

The space-keeping member 112b extending from the inside restricting member 112a is inserted between neighboring inside pairs of the segment ends, and thereby a predetermined space between the neighboring pairs is correctly kept. Similarly, the space-keeping member 112d extending from the outside restricting member 112c is inserted between neighboring outside pairs of the segment ends, and thereby a predetermined space between the neighboring pairs is correctly kept. Both of the inside and outside restricting members 112a, 112c function as plus-electrodes in the welding process.

After the U-shaped conductor segments are all inserted into the stator core 32 and all pairs of segment ends are arranged at the positions shown in FIG. 4, the stator 2 is mounted on the base plate 110 of the welding apparatus 100. Then, the all pairs of the segment ends are restricted by the restricting device 112 in a manner described above. The torch 102 is faced to one of the pairs of segment ends while keeping a predetermined distance therebetween. Electric voltage is supplied between the torch 102 functioning as a minus-electrode and the restricting device 112 functioning as a plus-electrode to cause an arc-discharge between the torch 102 and the pair of the segment ends. The segment ends forming the pair are welded and electrically connected to each other by heat generated by the arc-discharge. At the same time, inert gas such as argon or helium is supplied from the gas supplier 108 to a vicinity of the torch 102 to stabilize the arc-discharge and to prevent oxidation of the welding point. This method of arc-welding, in which a tungsten electrode is used as one of the welding electrodes and inert gas is supplied during the welding process, is generally known as "Tungsten Inert Gas arc-welding" (TIG).

The stator 2 mounted on the base plate 110 is rotated by the driving device 114, and all the pairs of the segment ends are welded one by one in the same manner as described above. The welding voltage is always applied to both welding electrodes during the welding process while rotating the stator 2 and keeping the predetermined distance between the torch 102 and the each pair of the segment ends. Since the welding apparatus 100 is continuously kept activated during a whole welding process, instable arc-discharge appearing at the beginning of power supply is avoided, and a time required for the welding process is shortened.

According to the present invention, the outside pairs of the segment ends and the inside pairs of the segment ends are aligned along respective coaxial circumferences, and each of the outside pairs and each of the inside pairs are positioned in zigzag manner, as shown in FIG. 4. Therefore, each pair can be individually restricted by the restricting device 112 as shown in FIG. 6, and the segment ends belonging to each pair closely contact each other. Accordingly, segment ends can be welded without fail.

Figure 7:
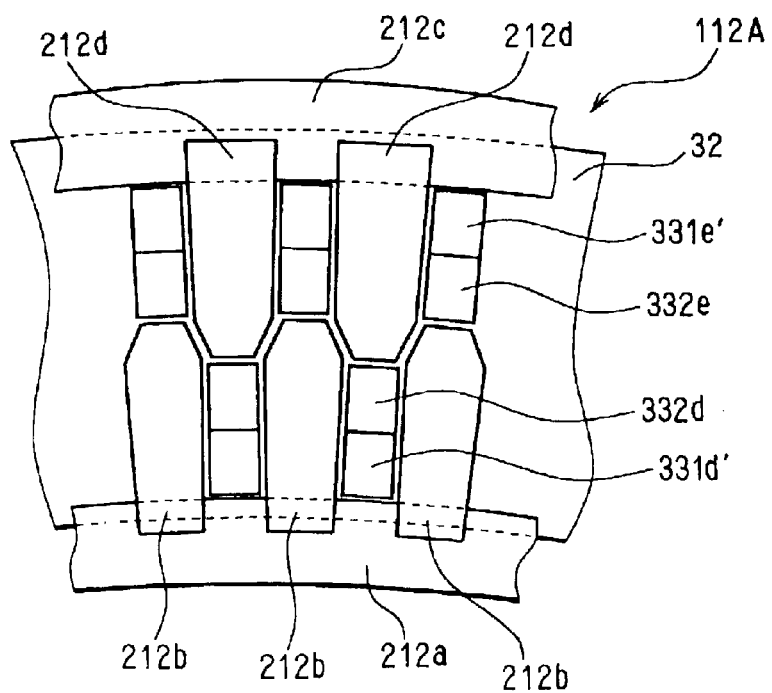
FIG. 7 is a plan view showing a modified form of the restricting device shown in FIG. 6.

The present invention is not limited to the embodiment described above, but it may be variously modified. For example, the space-keeping members 112b formed integrally with the inside restricting member 112a and the other space-keeping members 112d formed integrally with the outside restricting member 112c may be separately formed. This modified form of the restricting device 112A is shown in FIG. 7. The restricting device 112A is composed of: an inside restricting member 212a that presses the inside pairs 331d', 332d from their inside; an outside restricting member 212c that presses the outside pairs 331e', 332e from their outside; space-keeping members 212b that are inserted between neighboring inside pairs and press the outside pairs from their inside; and other space-keeping members 212d that are inserted between neighboring outside pairs and press the inside pairs from their outside. This modified form of the restricting device functions in a similar manner as the restricting device 112 used in the first embodiment.

Figure 8:
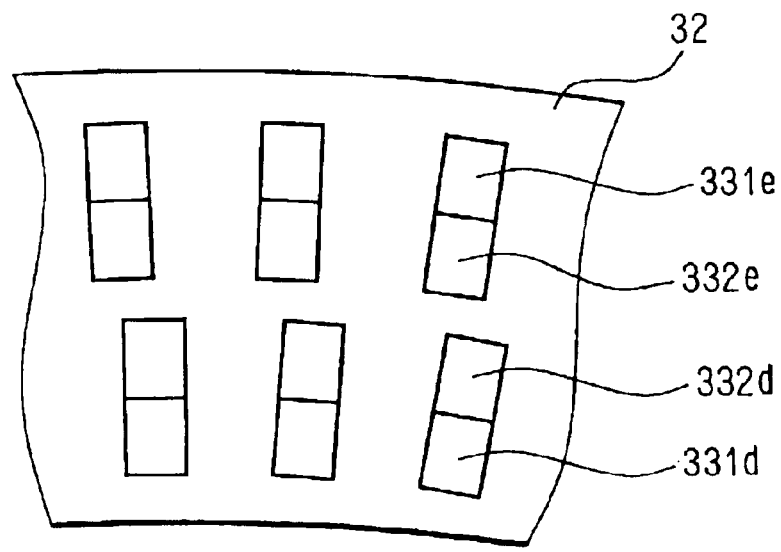
FIG. 8 is a plan view showing a modified form of the segment ends arrangement shown in FIG. 4.

The arrangement of the outside pairs and the inside pairs of the segment ends shown in FIG. 4 may be modified to the arrangement shown in FIG. 8. In this modified arrangement, each of the outside pairs and each of the inside pairs are positioned to partially overlap in the radial direction as shown in FIG. 8. Because there is a part not overlapping each other, it is possible to restrict each pair individually by pressing the non-overlapping part by the restricting device from both sides, i.e, from its outside and its inside. In this modified form of the arrangement, advantages similar to those of the first embodiment can be attained.

Figure 9:
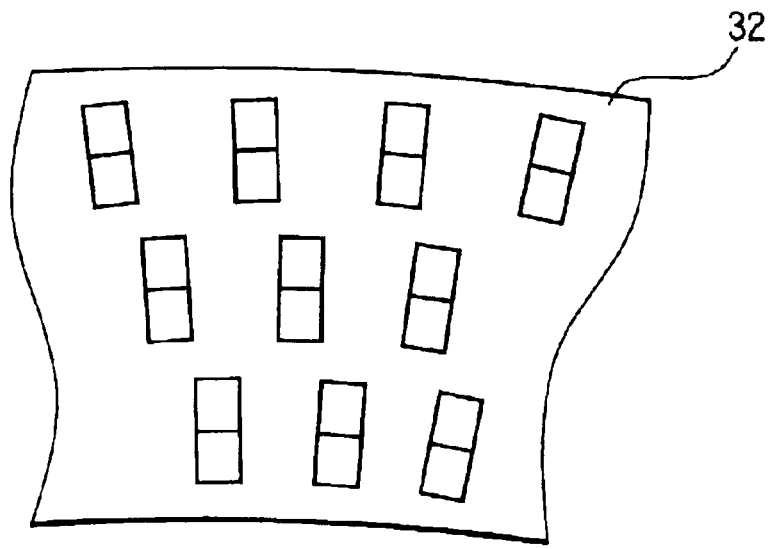
FIG. 9 is a plan view showing another modified form of the segment ends arrangement.
Figure 10:
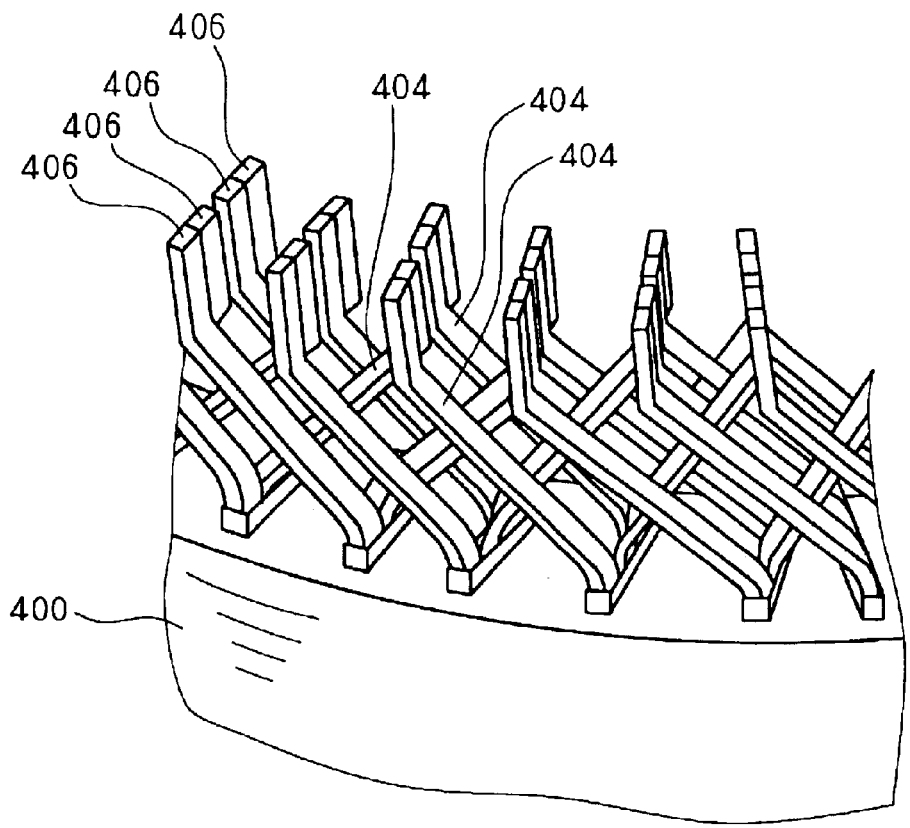
FIG. 10 is a perspective view showing a shape of segment ends extending from one axial end of a stator core in a conventional alternator.
Figure 11:
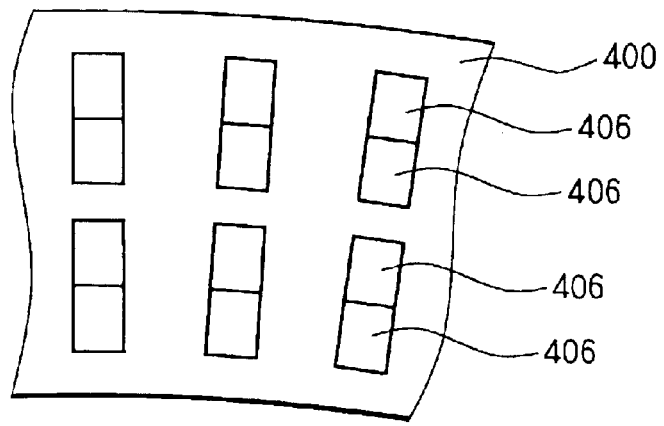
FIG. 11 is a plan view showing a conventional arrangement of segment ends.
Figure 12:
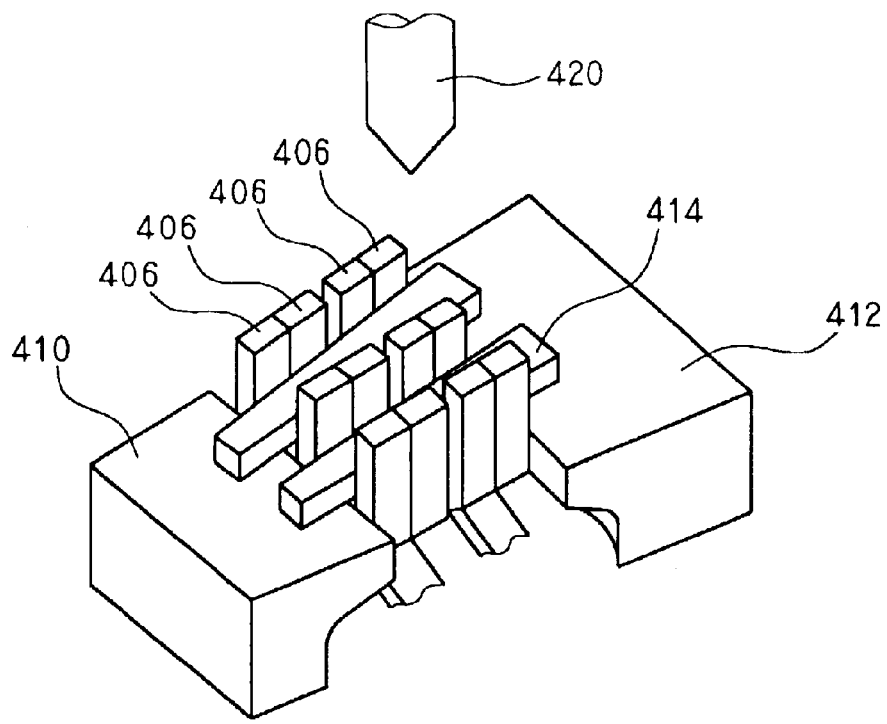
FIG. 12 is a perspective view showing a conventional device for restricting segment ends in a welding process.
Figure 13:
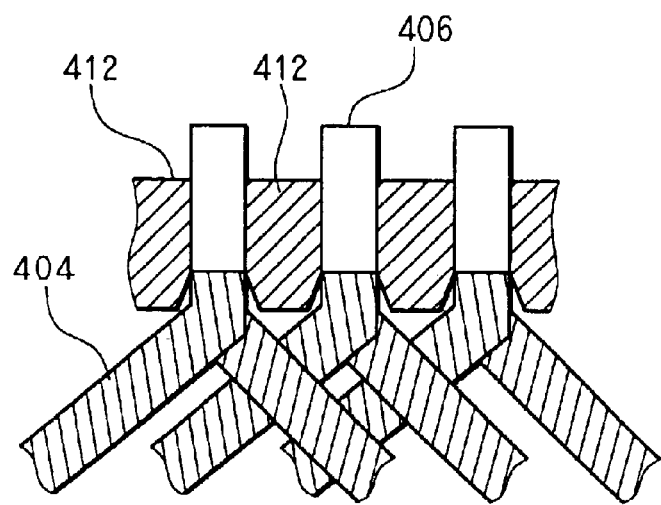
FIG. 13 is a cross-sectional view showing an outside electrode used in the device shown in FIG. 12.

Further, the pairs of the segment ends may be aligned along three or more coaxial circumferences as shown in FIG. 9. In this case, too, pairs aligned along respective circumferences are positioned in a zigzag manner in the radial direction, so that each pair can be individually restricted by the restricting device. In the first embodiment described above, TIG (Tungsten Inert Gas arc-welding) is used in the welding process. However, TIG may be replaced with other welding methods such as ultrasonic welding, soldering or the like.

While the present invention has been shown and described with reference to the foregoing preferred embodiment, it will be apparent to those skilled in the art that changes in form and detail may be made therein without departing from the scope of the invention as defined in the appended claims.

What is claimed is:

1. A method of forming a stator winding of a rotary machine, the method comprising steps of:

inserting U-shaped conductor segments into slots of a stator core so that segment ends of the U-shaped conductor segments extend from an axial end of the stator core;

arranging the segment ends so that pairs of segment ends, each pair to be electrically connected, are aligned along two or more coaxial circumferences, the pairs of segment ends aligned along one of the coaxial circumferences being positioned in a zigzag manner in a radial direction with respect to the pairs of segment ends aligned along other coaxial circumferences;

restricting a position of each pair of segment ends to establish a close contact between segment ends belonging to each pair by pressing individually a first segment of each pair of segment ends from its outside with an outside restricting member and from its inside with an inside restricting member, each restricting member including a space-keeping member that is inserted between neighboring pairs of segment ends for restricting the position of each pair of segment ends both in the circumferential direction and in the radial direction, and the space keeping member presses a second segment of each segment pair to establish the close contact with the first segment end; and electrically connecting segment ends belonging to each pair of segment ends by welding the segment ends by a welding apparatus.

2. The method of forming a stator winding as in claim 1, wherein:

a predetermined space in a circumferential direction between the neighboring pairs of segment ends is also kept by inserting the space-keeping member.

3. The method of forming a stator winding as in claim 2, wherein:

a portion of the space-keeping member is formed integrally with the outside restricting member and another portion of the space-keeping member is formed integrally with the inside restricting member.

4. The method of forming a stator winding as in claim 1, wherein the electrically connecting step includes steps of:

activating the welding apparatus; and causing relative movement between a welding electrode of the welding apparatus and the pairs of segment ends aligned along the circumference, while keeping a predetermined distance between the welding electrode and the pairs of segment ends and maintaining the welding apparatus activated, so that the pairs of segment ends are continuously welded one by one.

* * * * *